(12) United States Patent
Kumar et al.

(10) Patent No.: US 8,232,026 B2
(45) Date of Patent: Jul. 31, 2012

(54) BIPOLAR PLATES FOR ELECTROCHEMICAL CELLS

(75) Inventors: Atul Kumar, Farmington Hills, MI (US); Mark Stephens Ricketts, Windsor, OH (US); Shinichi Hirano, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 12/904,395

(22) Filed: Oct. 14, 2010

(65) Prior Publication Data
US 2012/0094203 A1    Apr. 19, 2012

(51) Int. Cl.
*H01M 8/00* (2006.01)
(52) U.S. Cl. ........................ 429/517; 429/523
(58) Field of Classification Search .......... 429/444, 429/434, 458, 483, 517, 518, 519, 523
See application file for complete search history.

(56) References Cited

U.S. PATENT DOCUMENTS

| | | | |
|---|---|---|---|
| 6,887,610 B2 | 5/2005 | Elhamid et al. | |
| 7,344,798 B2 | 3/2008 | Vyas et al. | |
| 7,597,987 B2 | 10/2009 | Takagi et al. | |
| 2002/0192531 A1* | 12/2002 | Zimmerman et al. | 429/38 |
| 2005/0102819 A1* | 5/2005 | Lee et al. | 29/592.1 |
| 2006/0019142 A1 | 1/2006 | Elhamid et al. | |
| 2006/0078776 A1 | 4/2006 | Elhamid et al. | |
| 2006/0093888 A1 | 5/2006 | Vyas et al. | |
| 2006/0257711 A1 | 11/2006 | Elhamid et al. | |
| 2008/0038619 A1* | 2/2008 | Takagi et al. | 429/34 |
| 2008/0044711 A1 | 2/2008 | Grafl et al. | |
| 2009/0098432 A1* | 4/2009 | Rosenberg et al. | 429/30 |
| 2009/0176139 A1 | 7/2009 | Elhamid et al. | |
| 2010/0104852 A1* | 4/2010 | Fletcher et al. | 428/315.5 |

OTHER PUBLICATIONS

L. Ma et al., Evaluation of Materials for Bipolar Plates in PEMFCs, Journal of New Materials for Electrochemical Systems, 3, 221-228 (2000).

* cited by examiner

*Primary Examiner* — Jennifer Michener
*Assistant Examiner* — Monique Wills
(74) *Attorney, Agent, or Firm* — Damien Porcari; Brooks Kushman P.C.

(57) ABSTRACT

In one embodiment, an electrochemical cell such as a fuel cell is provided to include a bipolar plate. The bipolar plate includes a metal substrate defining at least one flow channel having a channel span of no greater than 1.0 millimeter; and the metal substrate includes a stainless steel material less precious than stainless steel SS316L. In certain instances, the channel span is of 0.7 to 0.9 millimeters. In certain other instances, the flow channel has a channel depth of 0.3 to 0.5 millimeters. In yet other instances, the plate substrate includes stainless steel SS301, stainless steel SS302, or combinations thereof. In another embodiment, the electrochemical cell further includes a gas diffusion layer disposed next to the bipolar plate.

18 Claims, 4 Drawing Sheets

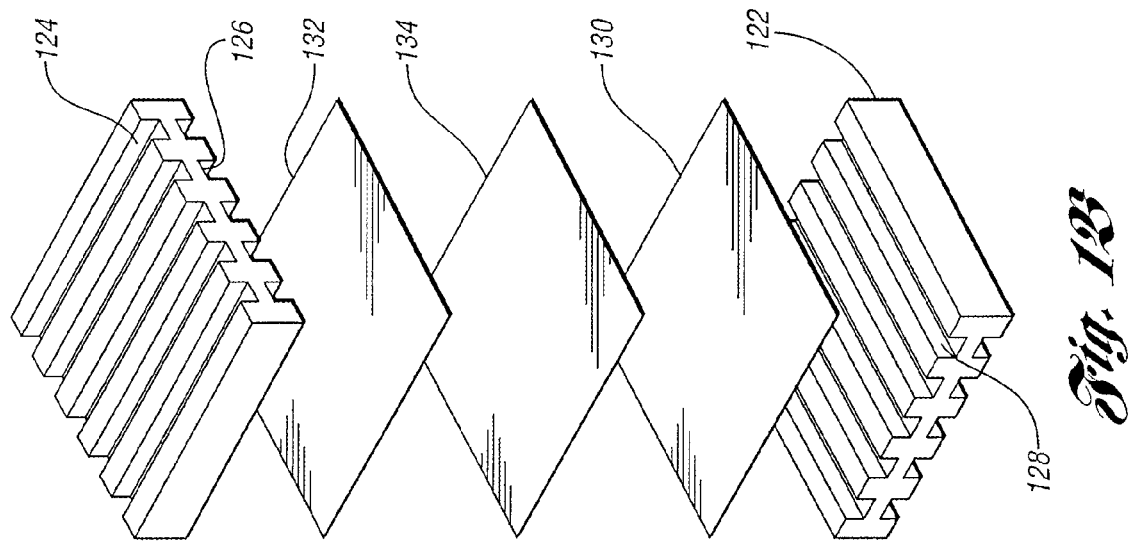
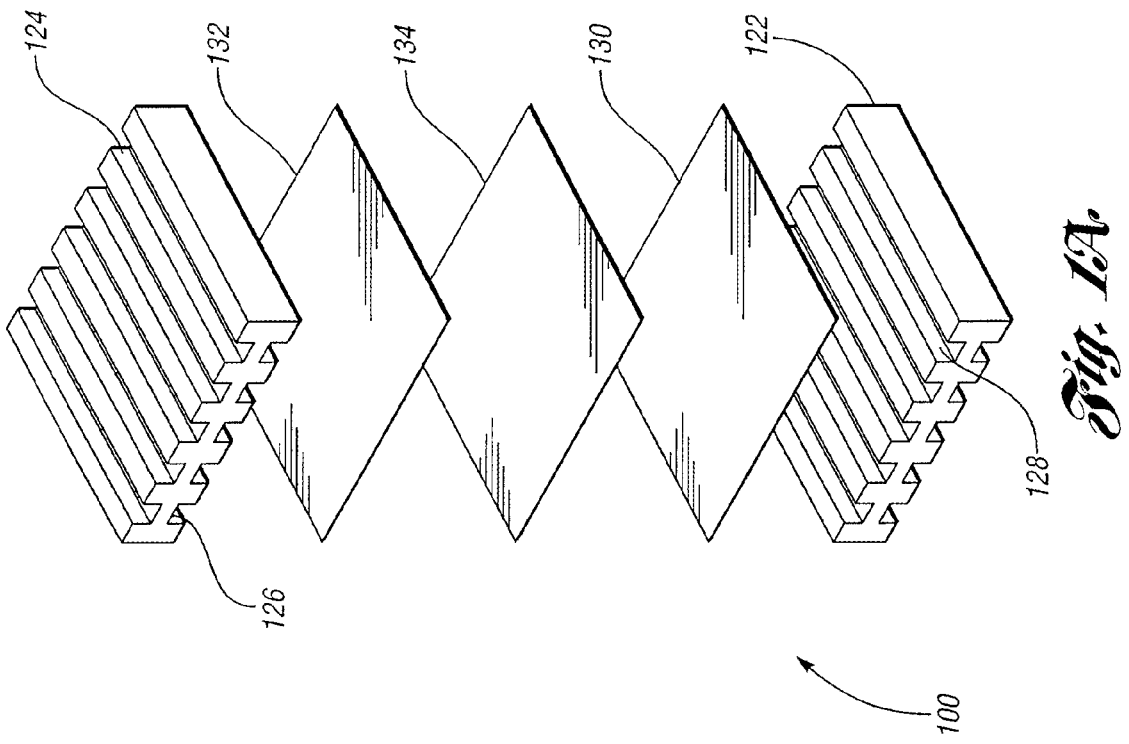

BIPOLAR PLATES FOR ELECTROCHEMICAL CELLS

BACKGROUND

1. Technical Field

The present invention relates to bipolar plates for electrochemical cells.

2. Background Art

An electrochemical cell, such as a fuel cell, generally includes two electrodes, two bipolar plates, and an electrolyte. In particular, the two electrodes, an anode and a cathode, are disposed between the two bipolar plates. The electrolyte is sandwiched between the two electrodes. The resulting structure includes, sequentially, a first bipolar plate, an anode, an electrolyte, a cathode, and a second bipolar plate. For greater energy output, one or more such fuel cells may be stacked together to form a fuel cell stack.

In the field of fuel cell technology, there are increasing requirements for fuel cell stacks with greater performance and longer life time. However, conventional bipolar plates have been met with limited use due to prohibitive material cost and/or less than satisfactory performance in formability, manufacturability, or corrosion resistance.

SUMMARY

In one aspect of the present invention, an electrochemical cell such as a fuel cell is provided. In one embodiment, the electrochemical cell includes a bipolar plate including a metal substrate defining at least one flow channel having a channel span, wherein the metal substrate includes a stainless steel material less precious than stainless steel SS316L and the channel span is no greater than 1.0 millimeter. In certain instances, the channel span is of 0.2 to 1.0 millimeters, 0.4 to 1.0 millimeters, or 0.6 to 1.0 millimeters. In certain other instances, the channel span is of 0.7 to 0.9 millimeters.

In another embodiment, the flow channel has a channel depth of 0.2 to 0.7 millimeters. In certain instances, the flow channel has a channel depth of 0.3 to 0.5 millimeters.

In yet another embodiment, the plate substrate includes first and second flow channels, wherein at least one of the flow channels has a channel span of 0.7 to 0.9 millimeters, and the other has a channel depth of 0.3 to 0.5 millimeters.

In yet another embodiment, the plate substrate includes stainless steel SS301, stainless steel SS302, stainless steel SS304, stainless steel SS321, stainless steel SS347, or combinations thereof.

In yet another embodiment, the electrochemical cell further includes a gas diffusion layer disposed next to the bipolar plate.

In yet another embodiment, the plate substrate further includes a coating.

BRIEF DESCRIPTION OF THE DRAWINGS

FIGS. 1A and 1B each depict a perspective view of a fuel cell according to one or more embodiments;

DETAILED DESCRIPTION OF ONE OR MORE EMBODIMENTS

Figure 2:
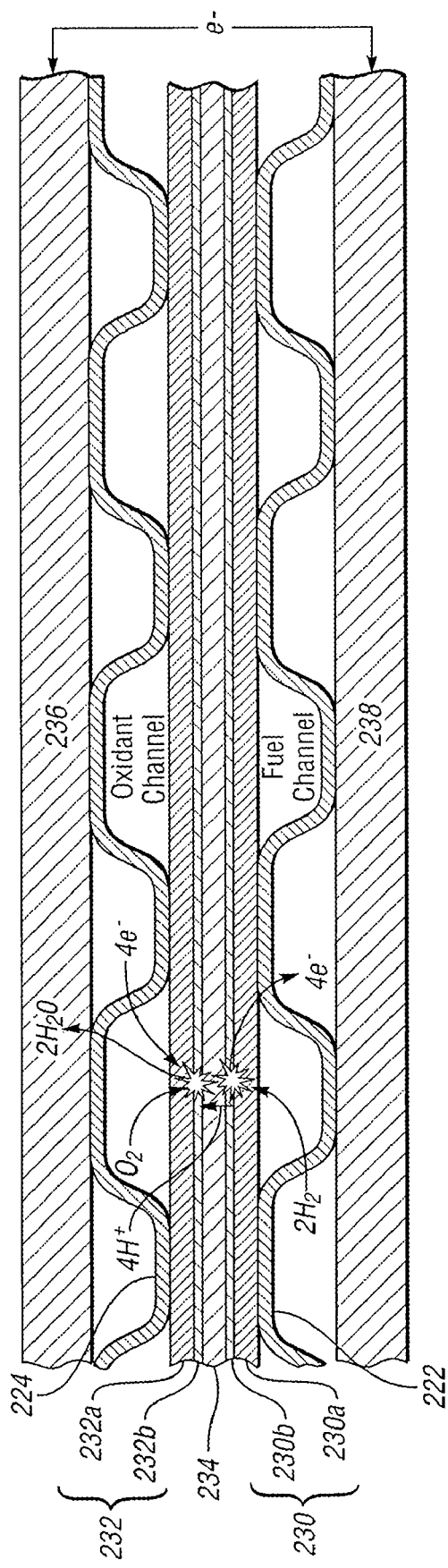
FIG. 2 depicts a cross-sectional view of the fuel cell of FIG. 1.
Figure 3:
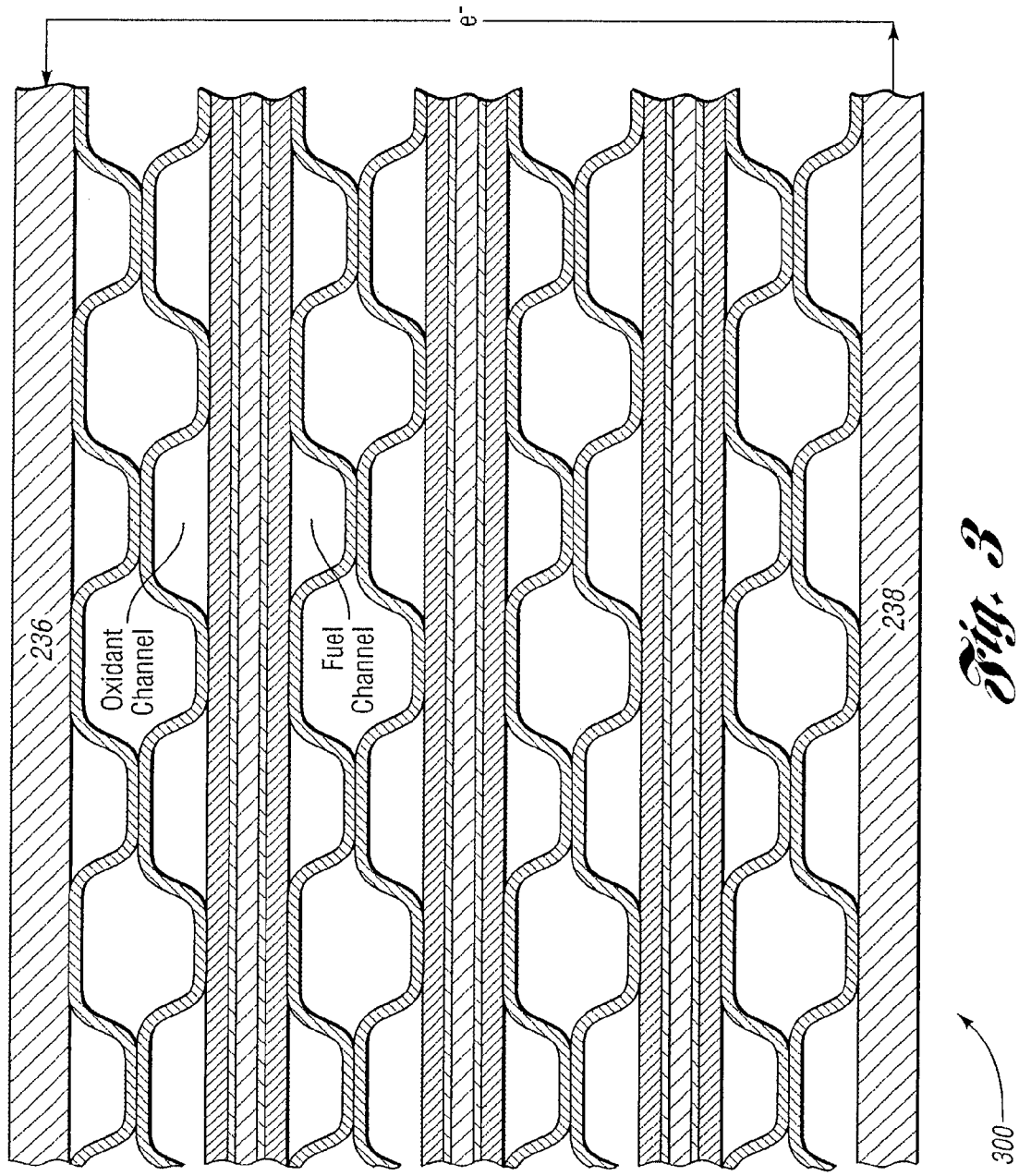
FIG. 3 depicts a cross-sectional view of a stack of two or more fuel cells of FIG. 1.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In one or more embodiments, the term "electrochemical cell" refers to a device capable of either deriving electrical energy from chemical reactions, or facilitating chemical reactions through the introduction of electrical energy. The electrochemical cell may include a non-rechargeable primary cell, a rechargeable secondary cell, or combinations thereof. For primary cells, when the initial supply of reactants is exhausted, energy cannot be readily restored to the electrochemical cell by electrical means. For secondary cells, chemical reactions may be reversed by supplying electrical energy to the cell, restoring their original composition. One non-limiting example of the electrochemical cell is a fuel cell.

According to one aspect of the present invention, and as depicted in FIGS. 1A and 1B, an electrochemical cell such as a fuel cell is generally shown at 100. In one embodiment, and as depicted in FIG. 1, the fuel cell 100 includes a pair of bipolar plates 122 and 124 having flow channels 126 and 128 formed thereupon, respectively. The flow channels 126, 128 may be formed at a predetermined interval on both sides of each of the bipolar plates 122 and 124. The fuel cell 100 also includes an ionic exchange membrane 134 disposed between the bipolar plates 122 and 124. A first electrode such as fuel electrode 130 disposed between the ionic exchange membrane 134 and the bipolar plate 122, and a second electrode such as an air electrode 132 disposed between the ionic exchange membrane 134 and the bipolar plate 124. The bipolar plates 122 and 124 electrically connect the first and second electrodes 130, 132, and reduce or prevent fuel and air (an oxidizer) from being mixed. As will be detailed herein below, the flow channels 126 and 128 are used as air and fuel passages in the cells connected end to end. The fuel cell 100 of FIG. 1A differs from the fuel cell 100 of FIG. 1B with regard to the relative orientation of the bipolar plates 122, 124.

In another embodiment, and as depicted in FIG. 2, a cross-sectional view of the fuel cell 100 of FIG. 1 is generally shown at 200. An ionic exchange membrane 234 is flanked by first and second electrodes 230, 232. In this configuration, the first electrode 230 includes a first gas diffusion layer 230a and a first catalyst layer 230b; and the second electrode 232 includes a second gas diffusion layer 232a and a second catalyst layer 232b. External to the electrodes 230, 232 are first and second bipolar plates 222, 224, respectively. Further external to the bipolar plates 222, 224 are first and second current collection plates 238, 236, respectively.

In operation, and as depicted in FIG. 2, hydrogen-containing fuel is brought into contact with the first electrode 230; and oxygen-containing air is brought into contact with the second electrode 232. Hydrogen ions are moved to the second electrode 232 side through the ionic exchange membrane 234, while the electrons move via on external circuit (not shown) to the second electrode 232 side. In the second electrode 232, oxygen, electrons, and hydrogen ions react to generate water.

When reactant gases are fed to respective electrodes 230, 232, it is believed that triple phase interface involving a gaseous phase (reactant gas), an ionically conducting phase, and an electrically conducting phase is formed. As depicted in FIG. 2, the electrochemical reactions include the following: On the first electrode side $H_2 \rightarrow 2H^+ + 2e^-$. On the second electrode side: $\frac{1}{2} O_2 + 2H^+ + 2e^- \rightarrow H_2O$. The hydrogen ions ($H^+$) formed on the first electrode side migrate to the second electrode side through the solid polyelectrolyte membrane, while electrons migrate to the second electrode side through an external load. On the other hand, on the second electrode side, oxygen contained in the oxidizing agent gas reacts with the $H^+$ ions and electrons coming from the first electrode side to form water. Thus, the fuel cell generates direct electric current from hydrogen and oxygen while forming water.

As depicted in FIG. 1, the 2-D extensive catalyst 102 is presented in a pseudo-bulk configuration such that the catalytic metals behave, relative to conventional nano-particles, more like bulk metals. In this pseudo-bulk configuration, the 2-D extensive catalyst 102 is presented as being x-axis and y-axis extensive relative to z-axis. As will be detailed herein below, the thickness dimension may be in a range of 2 to 20 atomic layers. Without wanting to be limited to any particular theory, it is believed that the 2-D extensive catalyst 102 of the catalyst assembly 100 is crystallographically oriented such that the catalytic activities of the 2-D extensive catalyst 102 may be effectively utilized.

Figure 4:
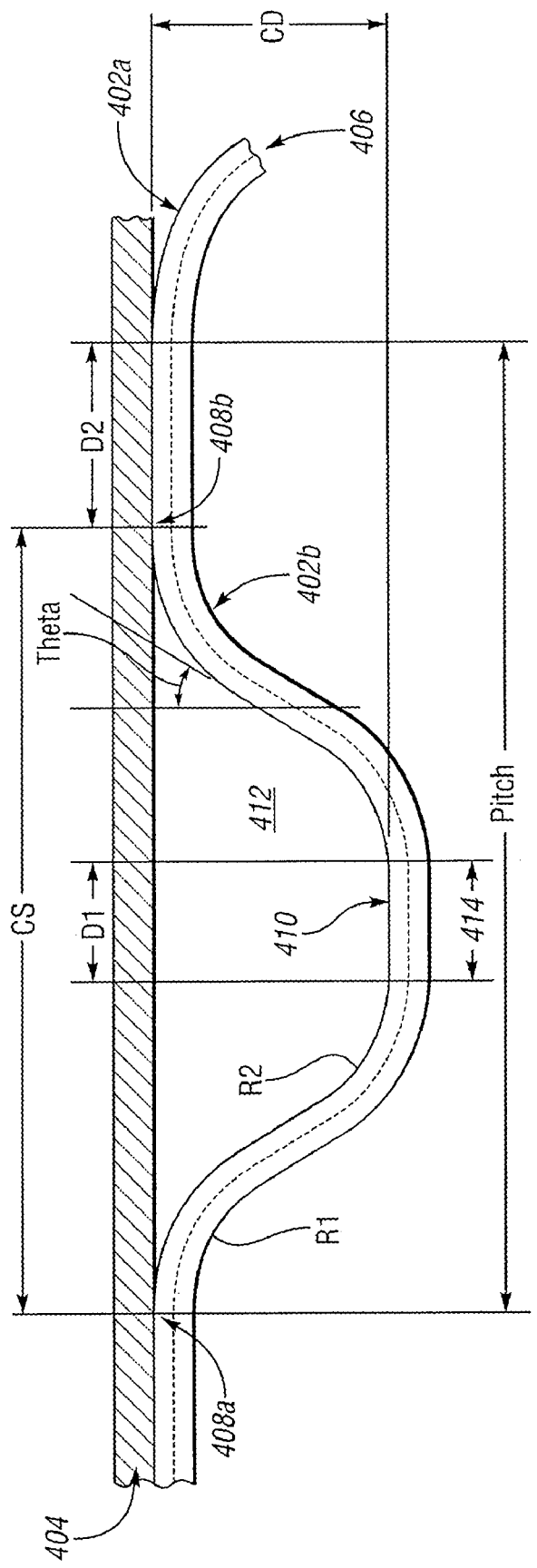
FIG. 4 depicts an enlarged cross-sectional view of a bipolar plate for the fuel cell of FIG. 1.

In yet another embodiment, and as depicted in FIG. 4, an enlarged cross-sectional view of the bipolar plate 222 or 224 is generally shown at 400. The bipolar plate 400 includes a plate substrate 406 having a first surface 402a and a second surface 402b. The first surface 402a contacts an adjacent gas diffusion layer 404 at points 408a and 408b, with a flow channel 412 defined in-between. A channel span "CS" may be defined as the lateral linear distance between the points 408a and 408b. A non-limiting feature of the flow channel 412 is the design of a substantially flat portion indicated at 414 having a middle point 410. The channel depth "CD" may be defined as the vertical linear distance between the points 408a or 408b and the middle point 410.

In one or more embodiments, and as illustratively depicted in FIG. 4, the channel span "CS" of the flow channel 412 is no greater than 1.0 millimeters. In certain instances, the channel span "CS" ranges from 0.2 to 1.0 millimeters, 0.3 to 1.0 millimeters, 0.4 to 1.0 millimeters, or 0.5 to 1.0 millimeters. In certain particular instances, the channel span "CS" of the flow channel 412 is of 0.6 to 1.0 millimeters, or of 0.7 to 0.9 millimeters.

Without wanting to be limited to any particular theory, it is believed these relatively smaller channel span values can be advantageous in helping broaden design windows for one or more structural parameters of the fuel cell. Certain low stiffness gas diffusion layers (GDLs) are preferably used to improve manufacturability of membrane electrode assembly (MEA). These low stiffness GDLs often show higher fuel cell performance at relatively high current densities. These low stiffness GDLs, often due to their relatively lower stiffness, are to be used in connection with only certain bipolar plates such as bipolar plates with relatively narrower channel spans, for instance, less than or equal to 1.0 millimeters. Creating these channel dimensions is not readily possible with conventional metallic bipolar plate materials such as stainless steel material SS316L. Without wanting to be limited to any particular theory, it is believed that these low stiffness GDLs, when used in connection with conventional SS316L, tend to move towards and sometimes emboss the relatively wider channels of SS316L. As a result of this GDL embossing, flow channels become collapsed more and more over time and the electrochemical activities eventually fail.

According to one or more embodiments of the present invention, the bipolar plates having channel spans less than or equal to 1.0 millimeters effectively make possible the implementation of the low stiffness GDLs in an electrochemical cell.

In one or more embodiments, the term "stainless steel" or "stainless steel material" refers to one or more stainless steel grade types. Stainless steel may be used when corrosion or oxidation is a problem. The function that the stainless steels perform may not be duplicated by other materials for their cost. For instance, the straight grades of stainless steel contain a maximum of 0.08% carbon, with no minimum carbon content requirement. For instance also, the "L" grades may provide an improved corrosion resistance post welding. In certain particular instances, the carbon of the L grades is kept to 0.03% or under. For instance also, the "H" grades contain a minimum of 0.04% carbon and a maximum of 0.10% carbon and are designated by the letter "H" after the alloy. In certain particular instances, "H" grades are primarily used when the material will be used at extreme temperatures as the higher carbon helps the material retain strength at extreme temperatures.

Without wanting to be limited to any particular theory, it is believed that reduced carbon content in various grades of the stainless steel materials helps reduce carbide precipitation. When heated to temperatures to certain high temperatures, such as 800 degrees F. to 1600 degrees F., carbon in steel may precipitate out and combine with the chromium and gathers on the grain boundaries. This deprives the steel of the chromium in solution and promotes corrosion adjacent to the grain boundaries. By controlling the amount of carbon, carbon-induced corrosion may be reduced.

Table 1 illustrates non-limiting sample compositions of various stainless steel material types according to one or more embodiments. As illustrated in Table 1, stainless steel SS301 may include no greater than 0.15 percent carbon (C), no greater than 2.00 percent manganese (Mn), no greater than 0.045 percent phosphorus (P), no greater than 0.030 percent sulfur (S), no greater than 1.00 percent silicone (Si), between 16.0 to 18.0 percent of chromium (Cr), between 6.0 to 8.0 percent nickel (Ni). Symbol "—" indicates a non-measurable amount.

TABLE 1

| Type | C | Mn | P | S | Si | Cr | Ni | Mo |
|------|---|----|----|----|----|----|----|----|
|      |   |    | no greater than |   |   |   |   |   |
| 301 | 0.15 | 2.00 | 0.045 | 0.030 | 1.00 | 16.0/18.0 | 6.0/8.0 | — |
| 302 | 0.15 | 2.00 | 0.045 | 0.030 | 1.00 | 17.0/19.0 | 8.0/10.0 | — |
| 304 | 0.08 | 2.00 | 0.045 | 0.030 | 1.00 | 18.0/20.0 | 8.0/11.0 | — |
| 309 | 0.20 | 2.00 | 0.045 | 0.030 | 1.00 | 22.0/24.0 | 12.0/15.0 | — |

TABLE 1-continued

| Type | C | Mn | P | S | Si | Cr | Ni | Mo |
|------|---|----|----|----|----|----|----|----|
|      |   |    |   | no greater than | | | | |
| 309S | 0.08 | 2.00 | 0.045 | 0.030 | 1.00 | 22.0/24.0 | 12.0/15.0 | — |
| 310  | 0.25 | 2.00 | 0.045 | 0.030 | 1.50 | 24.0/26.0 | 19.0/22.0 | — |
| 310S | 0.08 | 2.00 | 0.045 | 0.030 | 1.00 | 24.0/26.0 | 19.0/22.0 | — |
| 317  | 0.08 | 2.00 | 0.045 | 0.030 | 1.00 | 18.0/20.0 | 11.0/15.0 | 3.0/4.0 |
| 321  | 0.08 | 2.00 | 0.045 | 0.030 | 1.00 | 17.0/19.0 | 9.0/12.0 | — |
| 347  | 0.08 | 2.00 | 0.045 | 0.030 | 1.00 | 17.0/19.0 | 9.0/12.0 | — |

In one or more embodiments, the plate substrate 406 includes a stainless steel material less precious than stainless steel SS316L. The term "less precious" refers to a stainless steel material which includes, relative to stainless steel SS316L, less nickel, more carbon, or both. Without wanting to be limited to any particular theory, it is believed stainless steel material is relatively cheaper with increasing amount of carbon and/or decreasing amount of nickel.

In certain particular instances, the plate substrate 406 includes stainless steel SS301, stainless steel SS302, stainless steel SS304, stainless steel SS321, stainless steel SS347, or combinations thereof.

In yet another embodiment, the stainless steel material SS301 has a carbon concentration of 0.10 to 0.20 weight percent, or 0.13 to 0.17 weight percent.

In yet another embodiment, the stainless steel material SS301 has a chromium concentration of 14.0 to 20.0 weight percent, 15.0 to 17.0 weight percent, or 16.0 to 18.0 weight percent.

In yet another embodiment, stainless steel material SS301 has a nickel concentration of 4.0 to 10.0 weight percent, 5.0 to 9.0 weight percent, or 6.0 to 8.0 weight percent.

In yet another embodiment, a forming limit diagram (FLD) of stainless steel material SS301 represents a value of greater than 0.45, 0.50, 0.55, 0.60, or 0.65 in the major strain direction. In certain instances, when represented on the same forming limit diagram, stainless steel material SS301 has a higher forming limit curve (FLC) than stainless steel material SS304L. Without wanting to be limited to any particular theory, it is believed that relatively greater ability of SS301 to exhibit martensitic transformation contributes to its higher FLC.

In yet another embodiment, the stainless steel material SS302 has a carbon concentration of 0.10 to 0.20 weight percent, or 0.13 to 0.17 weight percent.

In yet another embodiment, the stainless steel material SS302 has a chromium concentration of 15.0 to 21.0 weight percent, 16.0 to 20.0 weight percent, or 17.0 to 19.0 weight percent.

In yet another embodiment, stainless steel material SS302 has a nickel concentration of 6.0 to 12.0 weight percent, 7.0 to 11.0 weight percent, or 8.0 to 10.0 weight percent.

In yet another embodiment, the stainless steel material SS304 has a carbon concentration of 0.05 to 0.11 weight percent, 0.06 to 0.10 weight percent, or 0.07 to 0.09 weight percent.

In yet another embodiment, the stainless steel material SS 304 has a chromium concentration of 16.0 to 22.0 weight percent, 17.0 to 21.0 weight percent, or 18.0 to 20.0 weight percent.

In yet another embodiment, the stainless steel material SS304 has a nickel concentration of 6.0 to 13.0 weight percent, 7.0 to 12.0 weight percent, or 8.0 to 11.0 weight percent.

In yet another embodiment, the stainless steel material SS309 has a carbon concentration of 0.16 to 0.24 weight percent, 0.17 to 0.23 weight percent, or 0.18 to 0.22 weight percent.

In yet another embodiment, the stainless steel material SS309 has a chromium concentration of 20.0 to 26.0 weight percent, 21.0 to 25.0 weight percent, or 22.0 to 24.0 weight percent.

In yet another embodiment, stainless steel material SS309 has a nickel concentration of 10.0 to 17.0 weight percent, 11.0 to 16.0 weight percent, or 12.0 to 15.0 weight percent.

In yet another embodiment, the stainless steel material SS309S has a carbon concentration of 0.05 to 0.11 weight percent, 0.06 to 0.10 weight percent, or 0.07 to 0.09 weight percent.

In yet another embodiment, the stainless steel material SS309S has a chromium concentration of 20.0 to 26.0 weight percent, 21.0 to 25.0 weight percent, or 22.0 to 24.0 weight percent.

In yet another embodiment, stainless steel material SS309S has a nickel concentration of 10.0 to 17.0 weight percent, 11.0 to 16.0 weight percent, or 12.0 to 15.0 weight percent.

In yet another embodiment, the stainless steel material SS310 has a carbon concentration of 0.22 to 0.28 weight percent, 0.23 to 0.27, or 0.24 to 0.26 weight percent.

In yet another embodiment, the stainless steel material SS310 has a chromium concentration of 22.0 to 28.0 weight percent, 23.0 to 27.0 weight percent, or 24.0 to 26.0 weight percent.

In yet another embodiment, stainless steel material SS310 has a nickel concentration of 17.0 to 24.0 weight percent, 18.0 to 23.0 weight percent, or 19.0 to 22.0 weight percent.

In yet another embodiment, the stainless steel material SS310S has a carbon concentration of 0.05 to 0.11 weight percent, 0.06 to 0.10 weight percent, 0.07 to 0.09 weight percent.

In yet another embodiment, the stainless steel material SS310S has a chromium concentration of 22.0 to 28.0 weight percent, 23.0 to 27.0 weight percent, or 24.0 to 26.0 weight percent.

In yet another embodiment, stainless steel material SS310S has a nickel concentration of 17.0 to 24.0 weight percent, 18.0 to 23.0 weight percent, or 19.0 to 22.0 weight percent.

In yet another embodiment, the stainless steel material SS317 has a carbon concentration of 0.05 to 0.11 weight percent, 0.06 to 0.10 weight percent, 0.07 to 0.09 weight percent.

In yet another embodiment, the stainless steel material SS317 has a chromium concentration of 16.0 to 22.0 weight percent, 17.0 to 21.0 weight percent, or 18.0 to 20.0 weight percent.

In yet another embodiment, stainless steel material SS317 has a nickel concentration of 9.0 to 17.0 weight percent, 10.0 to 16.0 weight percent, or 11.0 to 15.0 weight percent.

In yet another embodiment, the stainless steel material SS321 has a carbon concentration of 0.05 to 0.11 weight percent, 0.06 to 0.10 weight percent, or 0.07 to 0.09 weight percent.

In yet another embodiment, the stainless steel material SS321 has a chromium concentration of 15.0 to 21.0 weight percent, 16.0 to 20.0 weight percent, or 17.0 to 19.0 weight percent.

In yet another embodiment, stainless steel material SS321 has a nickel concentration of 7.0 to 14.0 weight percent, 8.0 to 13.0 weight percent, or 9.0 to 12.0 weight percent.

In yet another embodiment, the stainless steel material SS347 has a carbon concentration of 0.05 to 0.11 weight percent, 0.06 to 0.10 weight percent, or 0.07 to 0.09 weight percent.

In yet another embodiment, the stainless steel material SS347 has a chromium concentration of 15.0 to 21.0 weight percent, 16.0 to 20.0 weight percent, or 17.0 to 19.0 weight percent.

In yet another embodiment, stainless steel material SS347 has a nickel concentration of 7.0 to 14.0 weight percent, 8.0 to 13.0 weight percent, or 9.0 to 12.0 weight percent.

The plate substrate 406 can be of any suitable thickness. In general, thinner and hence lighter metal sheets are relatively harder to form with relatively deep and narrow channels. In certain instances, the plate substrate 406 has a thickness ranging from 0.08 to 0.15 millimeters, 0.09 to 0.14 millimeters, 0.10 to 0.13 millimeters, or 0.11 to 0.12 millimeters.

In yet another embodiment, the plate substrate 406 may include one or more additional suitable metallic materials, besides stainless steel materials. Non-limiting examples of the additional metallic materials for the plate substrate include titanium, molybdenum, copper, manganese, cobalt, tin, tungsten, iron, aluminum, alloys thereof, or combinations thereof. Particular ratios of these additional metallic materials relative to the stainless steel material may be readily determined based on several parameters specific to the project at hand. These parameters may include material and manufacturing costs, electrical conductivity and corrosion resistivity, material formability and manufacturability, and availability of material grades, gages, and coil widths.

In one or more embodiments, the term "formability" refers to the capability of a sheet metal to be shaped by plastic deformation in producing the plate substrate 406 and hence is primarily a measure of sheet metal material properties, such as yield and ultimate tensile strengths, total elongation, n-value and R-value.

In one or more embodiments, the term "manufacturability" refers to the degree of ease to manufacture a product, for example, joining metal plates into bipolar plates, stacking bipolar plates into a fuel cell stack, and assembling fuel cell stacks into a fuel cell module.

In yet another embodiment, the plate substrate 406 includes at least one coating. In certain instances, the plate substrate includes first and second surface coatings flanking the bulk of the plate substrate. Without wanting to be limited to any particular theory, it is believed that the coating helps reduce the interfacial electrical contact resistance and the membrane poisoning due to metallic ion leaching.

It has been further discovered that coating material selection strategies may be defined, wherein the material for the relatively thinner coating layer is designed in such a strategy to achieve the best corrosion resistance and lowest interfacial electrical contact resistance at adequate formability and acceptable cost, whereas the material for the relatively thicker sheet metal is selected in such a strategy to attain the best formability/manufacturability and lowest cost with adequate corrosion resistance and electrochemical properties required in fuel cell applications. These material selection strategies allow to optimize the utilization of various functional materials, tailored to take advantage of the merits of each material, while minimizing material and processing costs.

Non-limiting coating materials include niobium, platinum, ruthenium, palladium, rhodium iridium, gold, silver, carbon, or any alloys and combinations thereof.

Thickness for the coating on the plate substrate 406 can be of any suitable values. In case of gold coating, the thickness ranges from 8 to 100 nanometers, 8 to 40 nanometers, 8 to 20 nanometers, or 8 to 12 nanometers.

In one or more embodiments, an alloy or a metallic alloy refers a mixture of metals wherein at least one component metal presents crystal structure that differs from respective original structure of the metal in its pure metal form.

The bipolar plates 222, 224 can be made via any suitable methods. Non-limiting examples of these methods include stamping, hydro-forming, adiabatic forming, and combinations thereof.

While the best mode for carrying out the invention has been described in detail, those familiar with the art to which this invention relates will recognize various alternative designs and embodiments for practicing the invention as defined by the following claims.

What is claimed is:

1. An electrochemical cell comprising:
   a bipolar plate including a metal substrate defining at least one flow channel, the at least one flow channel including a channel span of no greater than 1.0 millimeter, the metal substrate including a stainless steel material less precious than stainless steel 316L; and
   a low stiffness gas diffusion layer disposed next to the bipolar plate and having a stiffness value of 2.0 GPa or less in Young's modulus.

2. The electrochemical cell of claim 1, wherein the metal substrate includes a stainless steel material having no less than 0.03 weight percent of carbon, no greater than 24.0 weight percent of nickel, or both.

3. The electrochemical cell of claim 1, wherein the metal substrate includes stainless steel SS301, SS302, SS304, SS309, SS309S, SS310, SS310S, SS317, SS321, SS347, or combinations thereof.

4. The electrochemical cell of claim 1, wherein the metal substrate includes stainless steel SS301, SS302, SS304, SS321, SS347, or combinations thereof.

5. The electrochemical cell of claim 1, wherein the channel span is of 0.6 to 1.0 millimeters.

6. The electrochemical cell of claim 1, wherein the channel span is of 0.7 to 0.9 millimeters.

7. The electrochemical cell of claim 1, wherein the at least one flow channel has a channel depth of 0.2 to 0.7 millimeters.

8. The electrochemical cell of claim 1, wherein the at least one flow channel has a channel depth of 0.3 to 0.5 millimeters.

9. The electrochemical cell of claim 1, wherein the at least one flow channel includes first and second flow channels, at least one of which having a channel span of 0.7 to 0.9 millimeters, and at least the other of which having a channel depth of 0.3 to 0.5 millimeters.

10. The electrochemical cell of claim 1, wherein the metal substrate further includes a coating disposed on one or two sides of the metal substrate, the coating including a coating material selected from the group consisting of niobium, platinum, ruthenium, palladium, rhodium iridium, gold, silver, carbon, or any alloys and combinations thereof.

11. The electrochemical cell of claim 10, wherein the metal substrate includes a coating including gold with 8 to 12 nanometers in thickness of the coating.

12. A fuel cell comprising:
    a bipolar plate including a metal substrate, the metal substrate including a stainless steel material less precious than stainless steel SS316L, having no greater than 28.0 weigh percent of chrominum and having at least one flow channel with a channel span, the channel span being no greater than 1.0 millimeter; and
    a low stiffness gas diffusion layer disposed next to the bipolar plate and having a stiffness value of 2.0 GPa or less in Young's modulus.

13. The bipolar plate of claim 12, wherein the metal substrate includes a stainless steel material having no less than 0.03 weight percent of carbon.

14. The bipolar plate of claim 12, wherein the channel span is of 0.7 to 0.9 millimeters.

15. The bipolar plate of claim 12, wherein the at least one flow channel is provided with a channel depth of 0.3 to 0.5 millimeters.

16. The bipolar plate of claim 12, wherein the metal substrate includes stainless steel SS301, stainless steel SS302, or combinations thereof.

17. A fuel cell comprising:
   a bipolar plate including stainless steel SS301, stainless steel SS302, or combinations thereof, the bipolar plate defining at least one flow channel having a channel span of 0.7 to 0.9 millimeters; and
   a low stiffness gas diffusion layer disposed next to the bipolar plate and having a stiffness value of 2.0 GPa or less in Young's modulus.

18. The fuel cell of claim 17, wherein the at least one flow channel is provided with a channel depth of 0.3 to 0.5 millimeters.

* * * * *